United States Patent
Tiwari

(10) Patent No.: US 8,553,616 B2
(45) Date of Patent: Oct. 8, 2013

(54) METHOD FOR REDUCING CLOSED SUBSCRIBER GROUP IDENTITY COMPARISON

(75) Inventor: Kundan Tiwari, Taoyuan County (TW)

(73) Assignee: HTC Corporation, Taoyuan, Taoyuan County (TW)

(*) Notice: Subject to any disclaimer, the term of this patent is extended or adjusted under 35 U.S.C. 154(b) by 189 days.

(21) Appl. No.: 12/882,200

(22) Filed: Sep. 15, 2010

(65) Prior Publication Data

US 2011/0069658 A1 Mar. 24, 2011

Related U.S. Application Data

(60) Provisional application No. 61/244,456, filed on Sep. 22, 2009.

(51) Int. Cl.
*H04W 4/00* (2009.01)

(52) U.S. Cl.
USPC .......................................................... 370/328

(58) Field of Classification Search
USPC .......................................................... 370/328
See application file for complete search history.

(56) References Cited

U.S. PATENT DOCUMENTS

| | | | |
|---|---|---|---|
| 2008/0267153 A1 | 10/2008 | Mukherjee | |
| 2009/0168727 A1* | 7/2009 | Somasundaram et al. | 370/332 |
| 2010/0112982 A1* | 5/2010 | Singh et al. | 455/411 |
| 2010/0240368 A1* | 9/2010 | Fox et al. | 455/435.3 |
| 2011/0028143 A1* | 2/2011 | Johansson et al. | 455/422.1 |
| 2012/0122460 A1* | 5/2012 | Dalsgaard et al. | 455/444 |

FOREIGN PATENT DOCUMENTS

| | | |
|---|---|---|
| CN | 101400107 A | 4/2009 |
| JP | 2005198082 A | 7/2005 |
| WO | 2008081816 A1 | 7/2008 |
| WO | 2008134281 A2 | 11/2008 |
| WO | 2009022980 A1 | 2/2009 |
| WO | 2009044317 A2 | 4/2009 |
| WO | 2010049911 A2 | 5/2010 |

OTHER PUBLICATIONS

3GPP TS 31.102 v 8.6.0 3GPP technical specification USIM Release 8 Mar. 2009.*
3GPP TS 36.304 v 8.5.0 3GPP technical specification USIM Release 8 Mar. 2009.*
3GPP TS 36.304 v 8.1.0 3GPP technical specification USIM Release 8 Mar. 2009.*

(Continued)

*Primary Examiner* — Chirag Shah
*Assistant Examiner* — Rina Pancholi
(74) *Attorney, Agent, or Firm* — Winston Hsu; Scott Margo

(57) ABSTRACT

A method for reducing CSG identity comparison for a mobile device in a wireless communication system is disclosed. The method includes the steps of including RAT information in an Allowed CSG list and an Operator CSG List, wherein the Allowed CSG list and the Operator CSG List are stored in an elementary file of the mobile device and the RAT information indicates a plurality of RATs associated with a plurality of CSG identities listed in the allowed CSG list; maintaining a plurality of sub-allowed CSG lists in an access stratum (AS) layer of the mobile device according to the plurality of RATs, wherein the number of the sub-allowed CSG lists corresponds to the number of the RATs; and comparing a CSG identity associated with a first RAT with the CSG identities listed in a first sub allowed CSG list corresponding to the first RAT.

6 Claims, 3 Drawing Sheets

(56) References Cited

OTHER PUBLICATIONS

3GPP TS 25.304 V8.5.0 (Mar. 2009) 3rd Generation Partnership Project; Technical Specification Group Radio Access Network; User Equipment (UE) procedures in idle mode and procedures for cell reselection in connected mode (Release 8).

3GPP TS 31.102 V8.6.0 (Mar. 2009) 3rd Generation Partnership Project; Technical Specification Group Core Network and Terminals; Characteristics of the Universal Subscriber Identity Module (USIM) application (Release 8).

3GPP TS 36.304 V8.5.0 (Mar. 2009) 3rd Generation Partnership Project; Technical Specification Group Radio Access Network; Evolved Universal Terrestrial Radio Access (E-UTRA); User Equipment (UE) procedures in idle mode (Release 8).

European patent application No. 10010060.1, European applicatin filed: Sep. 21, 2010, European Search Report mailing date: Jan. 19, 2011.

Office action mailed on Jan. 24, 2011 for the European application No. 10010060.1, filed Sep. 21, 2010, p. 1-6.

ETSI TS 123 122 V8.6.0, "Digital cellular telecommunications system (Phase 2+); Universal Mobile Telecommunications System (UMTS); LTE; Non-Access-Stratum (NAS) functions related to Mobile Station (MS) in idle mode-V8.6.0; 3GPP TS 23.122 version 8.6.0 Release 8", Jun. 2009, XP014044521, cover page + p. 1-41.

HTC Corporation, "Association of CSG Identity with RAT info", 3GPP TSG CT WG1 Meeting #61, C1-094088, Oct. 12-18, 2009, pp. 1-10, Phoenix (US), XP-002613311.

Qualcomm Europe, "UTRA HNB Idle Mode (Re)selection and UE Access Control", 3GPP TSG-RAN WG2 Meeting #62-bis, R2-083392, Jun. 30-Jul. 4, 2008, pp. 1-5, Warsaw, Poland.

Office action mailed on Oct. 25, 2011 for the Japanese application No. 2010-211850, filed Sep. 22, 2010, p. 1-2.

Office action mailed on Apr. 1, 2013 for the China application No. 201010297741.2, filing date Sep. 21, 2010, p. 1-7 and 41-42.

Office action mailed on Oct. 25, 2012 for the China application No. 201010297741.2, filing date Sep. 21, 2010, p. 1-5.

HTC Corporation, "Association of CSG Identity with RAT info", 3GPP TSG CT WG1 Meeting #61, C1-0940188, Oct. 12-18, 2009, Phoenix (US).

3rd Generation Partnership Project; Technical Specification Group Radio Access Network; Evolved Universal Terrestrial Radio Access (E-UTRA); User Equipment (UE) procedures in idle mode (Release 8), 3GPP TS 36.304 V8.6.0 (Jun. 2009).

* cited by examiner

METHOD FOR REDUCING CLOSED SUBSCRIBER GROUP IDENTITY COMPARISON

CROSS REFERENCE TO RELATED APPLICATIONS

This application claims the benefit of U.S. Provisional Application No. 61/244,456, filed on Sep. 22, 2009 and entitled "Method of associating RAT to CSG ID" the contents of which are incorporated herein.

BACKGROUND OF THE INVENTION

1. Field of the Invention

A method used in a wireless communication system and related communication device are provided, and more particularly to, a method for reducing closed subscriber group (CSG) identity comparison in a wireless communication system and related communication device.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs).

A closed subscriber group (CSG) cell is accessible only for a limited set of UEs (i.e. closed subscriber group). In order to prevent a UE from attempting to register on a CSG cell on which they do not have access, the UE maintains an allowed CSG list, i.e. a list of CSG identities (ids) for which access has been granted to the UE. The CSG id is an identifier broadcast by the CSG cell or cells and used by the UE to facilitate access for authorized members of the associated closed subscriber group.

All the CSG cells sharing the same identity are identifiable as a single group for the purposes of mobility management and charging in a PLMN.

In order to avoid handover attempts to CSG cells which are not in the UE's Allowed CSG list and operator CSG List, a preliminary access check of the measured CSG cell needs to be performed by the UE. The network typically only initiates the handover preparation towards a reported CSG cell if the UE indicates that the reported cell is an allowed CSG cell for the UE. Preliminary access check is not necessary for hybrid cells. The hybrid cell is accessed as a CSG cell by a UE whose Allowed CSG List or Operator CSG List contains the cell's CSG identity and as a normal cell by all other UEs.

In autonomous and normal cell reselection case, the UE having a non-empty allowed CSG list looks for the CSG cell. A UE supporting both UTRAN and E-UTRAN access modes, is capable of camping on both UTRAN and E-UTRAN CSG cells. During the CSG cell selection/reselection procedure, the UE compares the CSG id of the cell with its allowed CSG list to check if the cell belongs to its CSG group or not. Currently, the allowed CSG list has no association of CSG ID with its RAT, i.e. there is no distinction between E-UTRAN and UTRAN CSG IDs. The UE compares the CSG id of the cell being evaluated for cell selection/reselection with all CSG IDs in the allowed CSG list. This includes unnecessary comparisons of CSG id of the cell being evaluated with CSG ids in stored list belonging to other RAT.

This unnecessary comparison delays the cell selection and reselection procedure and impacts battery usage. The same problem also happens in the preliminary check procedure when the UE compares the cells CSG IDs with the allowed CSG list during the measurement reporting. The delay in sending the measurement report due to unnecessary CSG IDs comparison may cause a handover delay or radio link failure.

SUMMARY OF THE INVENTION

A method of reducing CSG identity comparison in a wireless communication system and related communication device are provided to avoid unnecessary CSG identity comparison.

A method for reducing CSG identity comparison for a mobile device of a wireless communication system is disclosed. The method includes the steps of including RAT information in an Allowed CSG list and Operator CSG list, wherein the Allowed CSG list and Operator CSG list are stored in an elementary file of the mobile device and the RAT information indicates a plurality of RATs associated with a plurality of CSG identities listed in the Allowed CSG list and Operator CSG list; maintaining a plurality of sub-allowed CSG lists in an AS layer of the mobile device according to the plurality of RATs, wherein the number of the sub allowed CSG lists corresponds to the number of the RATs; and comparing a CSG identity associated with a first RAT with the CSG identities listed in a first sub allowed CSG list corresponding to the first RAT.

A communication device for reducing CSG identity comparison in a wireless communication system is disclosed. The communication device includes means for including RAT information in an Allowed CSG list and an operator CSG list, wherein the Allowed CSG list and the Operator CSG list are stored in an elementary file of the mobile device and the RAT information indicates a plurality of RATs associated with a plurality of CSG identities listed in the Allowed CSG list and the operator CSG list; means for maintaining a plurality of sub-allowed CSG lists in an AS layer of the mobile device according to the plurality of RATs, wherein the number of the sub allowed CSG lists corresponds to the number of the RATs; and means for comparing a CSG identity associated with a first RAT with the CSG identities listed in a first sub allowed CSG list corresponding to the first RAT.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
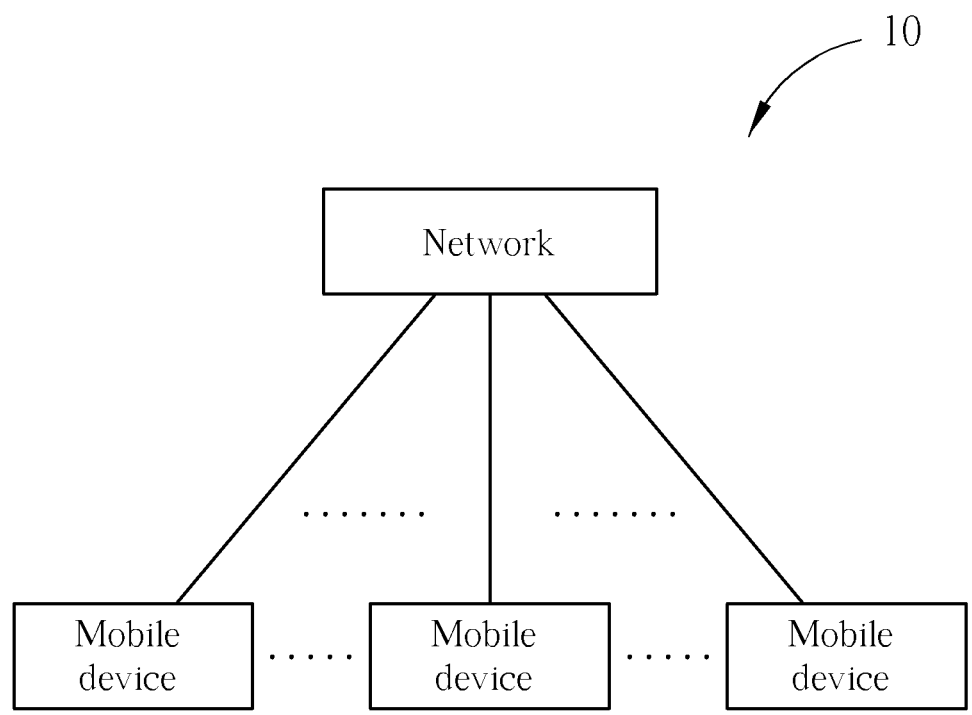
FIG. 1 illustrates a schematic diagram of an exemplary wireless communication system.

Please refer to FIG. 1, which is a schematic diagram of an exemplary wireless communication system 10. The wireless communication system 10, such as a long-term evolution (LTE) system, Universal Mobile Telecommunications System (UMTS) or other mobile communication systems, is briefly composed of a network and a plurality of user equipments (UEs). In FIG. 1, the network and the UEs are simply utilized for illustrating the structure of the wireless communication system 10. Practically, the network of the LTE system comprises a plurality of base stations, such as an E-UTRAN (evolved-UTAN) comprising a plurality of evolved Node-Bs (eNBs). The network of the UMTS system comprises a plurality of base stations, such as an UTRAN comprising a plurality of Node-Bs (NBs). The UEs can be devices such as mobile phones, computer systems, etc. Besides, the network and the UE can be seen as a transmitter or receiver according to transmission direction, e.g., for uplink, the UE is the transmitter and the network is the receiver, and for downlink, the network is the transmitter and the UE is the receiver.

Figure 2:
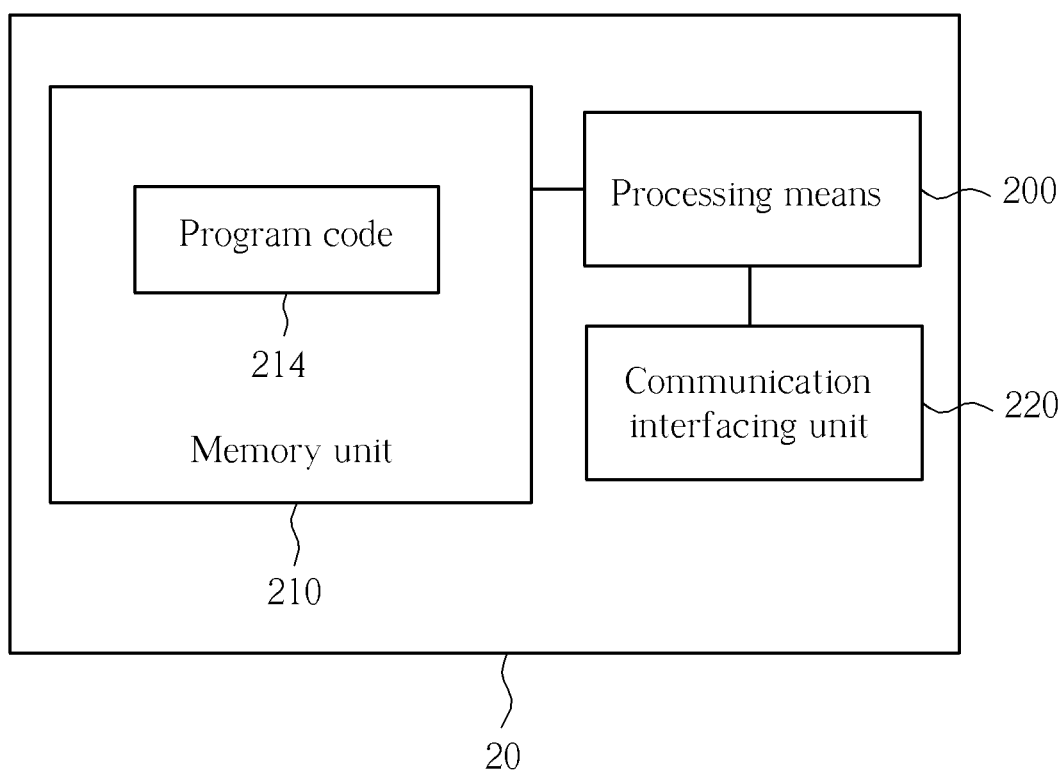
FIG. 2 illustrates a schematic diagram of an exemplary communication device.

FIG. 2 is a schematic diagram of an exemplary communication device 20. The communication device 20 can be the UE shown in FIG. 1 and may include a processor 200 such as a microprocessor or ASIC, a memory unit 210, and a communication interfacing unit 220. The memory unit 210 may be any data storage device that can store program code 214, for access by the processor 200. Examples of the memory unit 210 include but are not limited to a subscriber identity module (SIM), read-only memory (ROM), random-access memory (RAM), CD-ROMs, magnetic tapes, hard disks, and optical data storage devices. The communication interfacing unit 220 is preferably a radio transceiver for wirelessly communicating with the network according to processing results of the processor 200.

Figure 3:
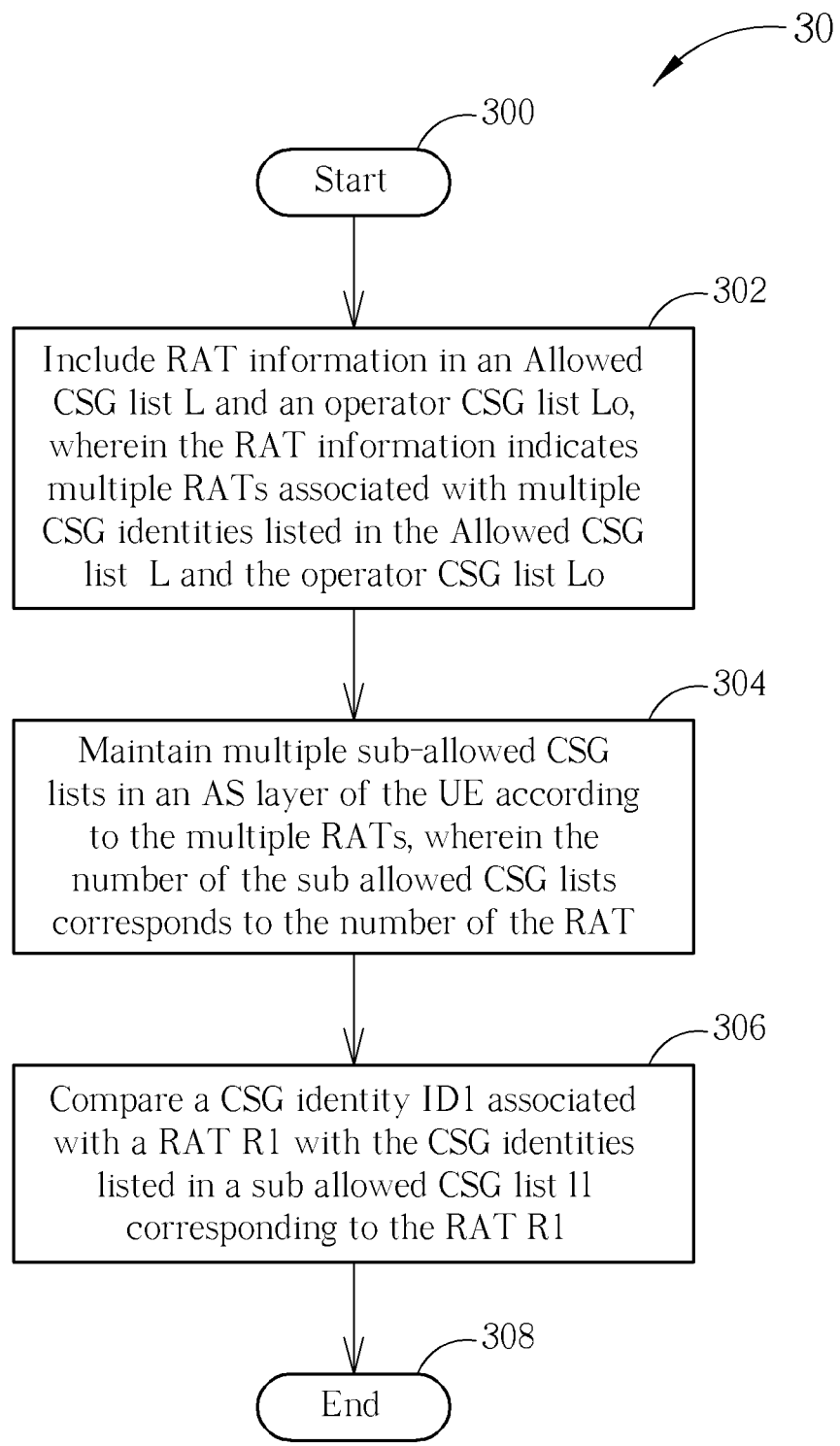
FIG. 3 is a flow chart of an exemplary process.

Please refer to FIG. 3, which is a flowchart of an exemplary process 30. The process 30 is utilized for handling paging for a UE in the wireless communication system 10 and can be compiled into the program code 214. The UE may support both UTRAN and E-UTRAN and be capable of camping on both UTRAN and E-UTRAN closed subscriber group (CSG) cells. The process 30 includes the following steps:

Step 300: Start.

Step 302: Include radio access technology (RAT) information in an Allowed CSG list L and an Operator CSG list Lo, wherein the RAT information indicates multiple RATs associated with multiple CSG identities listed in the Allowed CSG list and the Operator CSG list Lo.

Step 304: Maintain multiple sub-allowed CSG lists in an access stratum (AS) layer of the UE according to the multiple RATs, wherein the number of the sub allowed CSG lists corresponds to the number of the RAT Step 306: Compare a CSG identity ID1 associated with a RAT R1 with the CSG identities listed in a sub allowed CSG list 11 corresponding to the RAT R1.

Step 308: End.

According to the process 30, the UE includes the RAT information in the Allowed CSG list L and the Operator CSG list Lo. The allowed CSG list L and the Operator CSG list Lo are stored in an elementary file (i.e. EFACSGL). The EFACSGL contains the coding for CSG identity belonging to the Allowed CSG list L and the Operator CSG list Lo. Furthermore, for each CSG identity in the Allowed CSG list L and the Operator CSG list Lo, a link to its corresponding home base station name and CSG Type may be provided. A base station for controlling a CSG cell is called home base station. Besides the RAT information, mobile country code/mobile network code (MCC/MNC) may be included in the Allowed CSG list L as well. Preferably, the RAT information indicates the RATs, which are associated with CSG identities in the Allowed CSG list L and the Operator CSG list Lo. In other words, by including the RAT information in the Allowed CSG list L and the Operator CSG list Lo, the UE associates the CSG identities with their corresponding RATs. A non-access stratum (NAS) layer of the UE may read the Allowed CSG list L and the Operator CSG list Lo including the RAT information from the elementary file, and pass the Allowed CSG list L and the Operator CSG list Lo to an access stratum (AS) layer of the UE. The UE may maintain multiple sub-allowed CSG lists in the AS layer according to RATs. The number of the sub-allowed CSG lists corresponds to the number of the RATs. During a cell selection or a cell reselection, the UE may select a new cell and receive the CSG identity ID1 of the new cell. The new cell is served by a network using the RAT R1 and the UE compares the CSG identity ID1 with the CSG identities in the sub-allowed CSG list 11 corresponding to the RAT R1. A preliminary access check of the measured CSG cell needs to be performed by the UE in order to avoid handover attempts to CSG cells which are not in the UE's Allowed CSG list L. In some examples, the UE compares the CSG identity ID1 with the CSG identities in the sub-allowed CSG list 11 corresponding to the RAT R1 when the UE performs the preliminary access check procedure. Compared with the prior art, when the UE select a new cell during the cell selection/reselection or the preliminary access check procedure, the UE merely compares the CSG identity of the new cell with those associated with its corresponding RAT. Namely, the UE does not need to compare CSG identities belonging to irrelevant RATs. Therefore, the UE may spend less time on CSG identity comparison and avoid handover delay or radio link failure caused by unnecessary CSG identity comparison.

For example, a UE supporting both UTRAN and E-UTRAN selects a CSG cell C1 during the cell selection/reselection procedure or the preliminary access check procedure. The CSG cell has a CSG identity ID1. The UE includes the RAT information in the Allowed CSG list L and the Operator CSG list Lo, thereby associating the CSG identities in the allowed CSG list L with UTRAN and E-UTRAN. After the NAS layer of the UE reads the Allowed CSG list L and the Operator CSG list Lo and passes it to the AS layer of the UE, the AS layer maintains two sub-allowed CSG lists 11 and 12. The sub-allowed CSG list 11 includes the CSG identities associated with E-UTRAN and the sub-allowed CSG list 12 includes the CSG identities associated with UTRAN. If the CSG cell C1 is served by E-UTRAN, the UE compares the CSG identity ID1 of the cell C1 with those in the sub-allowed CSG list 11. If the CSG cell C1 is served by UTRAN, the UE compares the CSG identity ID1 of the cell C1 with those in the sub-allowed CSG list 12. The UE only compares CSG identities associated with the RAT (e.g. UTRAN or E-UTRAN) serving the CSG cell C1. This can reduce unnecessary comparison.

In addition, the elementary file with the RAT information may be modified by a user or an operator. In other words, the UE and the network may modify or add the RAT information of the Allowed CSG list L of the elementary file. The network may modify the elementary file by an over the air (OTA) message. The OTA message containing the RAT information is sent to the UE to add or modify the RAT information of the Allowed CSG list of the elementary file. When the network modifies the elementary file through OTA message, the network provides the CSG identity with MCC/MNC and new RAT information. When a security identity (SIM) card of the UE gets the OTA message it updates the elementary file with new the RAT information. On the other hand, the UE may modify the elementary file through a NAS procedure, such as a manual CSG identity selection procedure. A user may manually select the CSG identity through an interface or application of the UE. The UE may trigger the manual CSG identity selection procedure to modify the elementary file. If the UE manually selects the CSG identity, the UE adds the CSG identity in the allowed CSG list L when local registration is successful. When the UE modifies the elementary file, the NAS layer of the UE provides the RAT information to the SIM card along with the CSG identity and MCC/MNC.

Please note that the abovementioned steps including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20 in which the processor 200 processes the program code 214 related to the abovementioned processes and the processed results can reduce CSG identity comparison in the wireless communications system 20.

To sum up, the UE associates the CSG identity with RAT by including the RAT information in the Allowed CSG list and the Operator CSG list. When the UE selects a new cell during the cell selection/reselection procedure or the preliminary access check procedure, the UE merely compares the CSG identity of the new cell with the CSG identities included in the sub-allowed CSG list corresponding to its RAT. As a result, the UE need not compare CSG identities belonging to irrelevant RATs. This may reduce unnecessary CSG identity comparison and thereby avoid handover delay or radio link failure caused by unnecessary CSG identity comparison.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for reducing closed subscriber group (CSG) identity comparison for a mobile device of a wireless communication system, the method comprising:

including radio access technology (RAT) information in an allowed CSG list, wherein the allowed CSG list comprises a plurality of CSG identities and is stored in an elementary file of the mobile device and the RAT information indicates a plurality of RATs associated with the allowed CSG list;

controlling a non-access stratum (NAS) layer of the mobile device to read the allowed CSG list comprising the RAT information from the elementary file and pass the allowed CSG list comprising the RAT information to the AS layer;

maintaining a plurality of sub-allowed CSG lists in the AS layer of the mobile device according to the plurality of RATs, wherein each of the plurality of sub-allowed CSG lists is corresponding to a different RAT; and comparing a CSG identity of a first cell serving a first RAT, which the mobile device performs cell selection or cell reselection with the CSG identities listed in a first sub allowed CSG list corresponding to the first RAT.

2. The method of claim 1 further comprising:
modifying the elementary file by a NAS procedure.

3. The method of claim 1 further comprising:
receiving an over the air, OTA, message from a network, where OTA message is used for modifying the RAT information of the Allowed CSG list of the elementary file.

4. A communication device for reducing closed subscriber group (CSG) identity comparison in a wireless communication system, the communication device comprising:

a memory unit for storing program code corresponding to a process; and a processor coupled to the memory unit, for processing the program code to execute the process;

wherein the process comprises:

including radio access technology (RAT) information in an Allowed CSG list and an operator CSG list, wherein the Allowed CSG list comprises a plurality of CSG identities and is stored in an elementary file of the communication device and the RAT information indicates a plurality of RATs associated with a plurality of CSG identities listed in the allowed CSG list;

controlling a non-access stratum (NAS) layer of the communication device to read the allowed CSG list comprising the RAT information from the elementary file and pass the allowed CSG list comprising the RAT information to the AS layer;

maintaining a plurality of sub-allowed CSG lists in the AS layer of the communication device according to the plurality of RATs, wherein each of the plurality of sub-allowed CSG lists is corresponding to a different RAT; and comparing a CSG identity of a first cell serving a first RAT, which the communication device performs cell selection or cell reselection to, with the CSG identities listed in a first sub allowed CSG list corresponding to the first RAT.

5. The communication device of claim 4, wherein the process further comprises:
modifying the elementary file by a NAS procedure.

6. The communication device of claim 4, wherein the process further comprises:
receiving an over the air (OTA) message from a network, where OTA message is used for modifying the RAT information of the Allowed CSG list of the elementary file.

* * * * *